Nov. 10, 1964  H. C. FRENTZEL  3,156,336
TRANSMITTER CLUTCH DISC ALIGNMENT ADJUSTING MECHANISMS
Filed Jan. 2, 1963  2 Sheets-Sheet 1
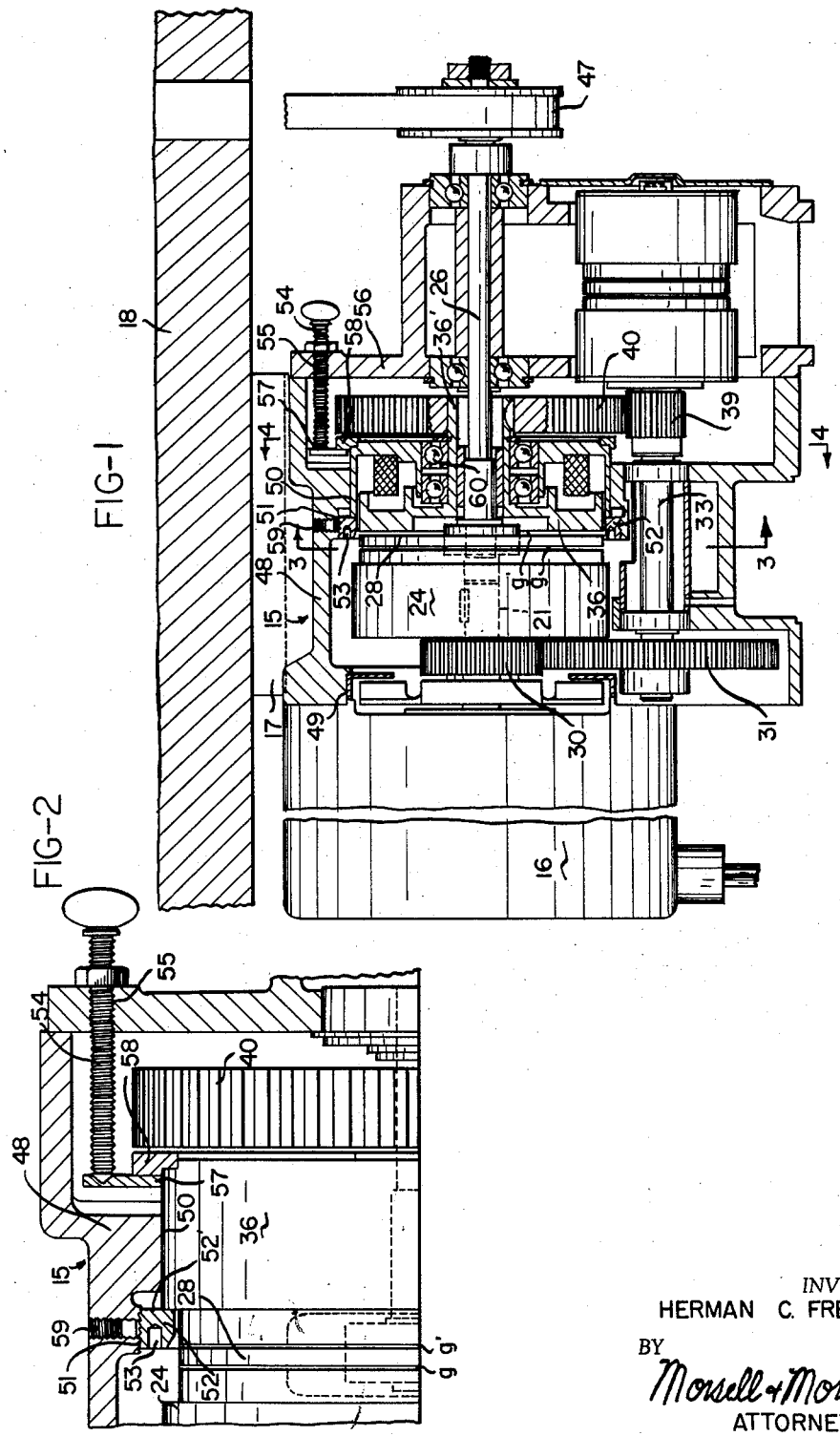
INVENTOR.
HERMAN C. FRENTZEL
BY
Morsell & Morsell
ATTORNEYS

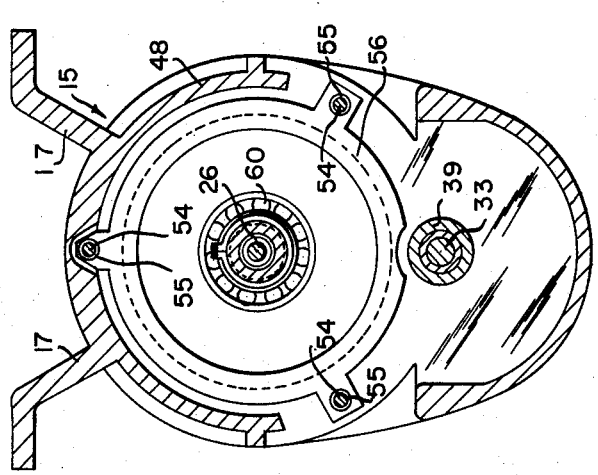
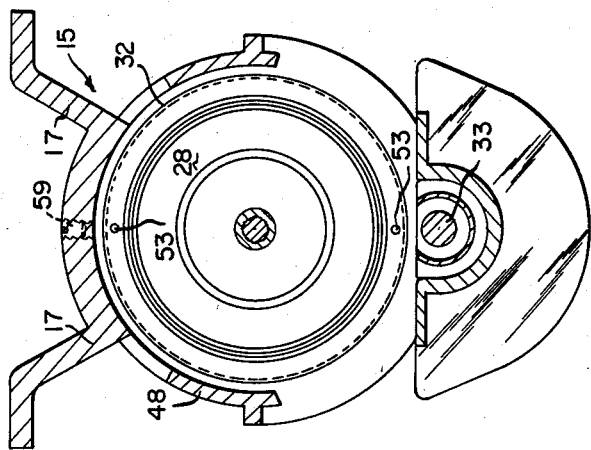

United States Patent Office 3,156,336
Patented Nov. 10, 1964

3,156,336
TRANSMITTER CLUTCH DISC ALIGNMENT
ADJUSTING MECHANISMS
Herman C. Frentzel, Milwaukee, Wis., assignor to Hansen
Glove Corporation, Milwaukee, Wis., a corporation of
Wisconsin
Filed Jan. 2, 1963, Ser. No. 249,047
2 Claims. (Cl. 192—110)

This invention relates to improvements in transmitter clutch disc alignment adjusting mechanisms.

A general object of the invention is to provide in an electrically-controlled, solenoid-operated tool control unit or transmitter which includes clutch discs, easily manipulated means for ensuring that the clutch disc faces are in parallelism and on the same center line, the mechanism additionally including means for adjusting one clutch disc to provide suitable clearance between its face and the face of the companion clutch disc.

A more specific object of the present invention is to provide in a transmission device having companion clutch discs, simple means for adjusting one of the clutch discs relative to the companion disc to maintain proper parallelism, there also being a ball bearing mounting for the clutch disc shaft which serves as a bearing for the gear drive and output shaft of the assemblage.

A further specific object of the invention is to provide in a clutch disc equipped transmitter assemblage adjustable means for ensuring that the bores and adjusting screw threads in the housing are concentric, with their axes at right angles to the faces of the clutch discs to ensure parallelism and concentricity of the clutch discs.

A further object of the invention is to provide a clutch plate alignment adjusting mechanism adaptable to various types of transmissions and transmitters, which is simple to manipulate and which is well adapted for the purposes described.

With the above and other objects in view, the invention consists of the improved transmitter clutch plate alignment adjusting mechanism, and its parts and combinations as set forth in the claims, and all equivalents thereof.

In the accompanying drawings, in which the same reference characters indicate the same parts in all of the views:

FIG. 1 is a view partly in vertical section of an electrically-controlled solenoid-operated transmitter equipped with the improved clutch plate alignment adjusting mechanism, the transmitter being depended from a support;

FIG. 2 is an enlarged fragmentary sectional view of a portion of the transmitter and the companion clutch discs, showing components of the clutch plate alignment adjusting mechanism;

FIG. 3 is a transverse sectional view taken approximately along line 3—3 of FIG. 1; and FIG. 4 is a similar transverse sectional view taken approximately along line 4—4 of FIG. 1.

The electrically-controlled solenoid-operated transmitter in which the clutch plate alignment adjusting mechanism is embodied finds particular utility in connection with the operation of a machine tool, and said transmitter is essentially of the type shown and described in the H. C. Frentzel Patent No. 3,026,834.

The transmitter is indicated generally by the numeral 15 and is directly associated or incorporated with any type of power source such as an electric motor 16. The transmitter 15 and motor 16 are preferably in the form of a unit and carry upwardly-directed brackets 17 providing means whereby the unit may be secured to or depended from the table portion 18 of a machine tool.

The outwardly-extending shaft of the electric motor is designated by the numeral 21, and said shaft extends axially through a clutch disc 24 having therein an energizeable clutch coil as shown in Patent No. 3,026,834.

Axially aligned with the end portion of the motor shaft 21 is an output or pulley shaft 26 on which is splined the central hub portion of an armature plate or disc 28 having clutch and brake facings. When the motor shaft 21 is being driven by the electric motor 16 and the coil of clutch disc 24 is energized (as in Patent No. 3,026,834), rotative power is transmitted to the armature plate 28. Because of the latter's splined connection with the inner end of the output of pulley shaft 26, the latter will be directly driven thereby at a high rate of speed. There is included in the transmitter a train of gears driven continuously from the motor shaft 21. This train of gears includes gear 30 which is carried fast by the hub of clutch disc 24. Gear 30 meshes with gear 31 which, under certain conditions, drives a shaft 33 having fast thereon a pinion gear 39. The latter meshes continuously with a gear 40 which is keyed to the hub portion 36' of a splined drive clutch rotor 36. When the coil of clutch disc 24 is energized it draws to the left on the shaft 26 the armature plate 28 and engages a face thereof with the adjacent face of the clutch disc 24. This causes the other face of the armature plate 28 to be free of driving engagement with the adjacent face portion of the clutch rotor 36. These conditions exist when the output shaft 26 is being driven at high speed directly by the motor shaft 21 and the train of gears in the transmission will be idling at a reduced gear ratio.

As described in Patent No. 3,026,834, if the operation of the machine (not shown) with which the transmitter is associated is to be stopped, the coil in clutch disc 24 is deenergized and the coil in clutch rotor 36 is energized. Consequently, the armature plate 28 becomes disengaged from the clutch disc 24 and engages the inner face of the rotor 36 so that plate 28 then rotates at the speed of rotor 36. Due to the fact that armature plate 28 is keyed to the output shaft 26, the latter, and a pulley 47 fast thereon, will be driven at the speed of rotor 36 in gear 40, which is of substantially reduced speed, which takes place before the cessation of operation is effected.

Other operational features of the transmitter per se are dealt with in Patent No. 3,026,834 and form no part of the present invention.

As was previously mentioned, the main objective of the present invention is to incorporate in the transmitter mechanism which will permit alignment of the clutch discs or plates to maintain the faces of the same in parallelism and on the same center line. As will be noted from FIGS. 1 and 2 of the drawings, the clutch discs 24 and 36 have a common axis and their adjacent faces are separated by the interposed armature plate 28. The total of the gaps $g$ and $g'$ (FIG. 2) should be about .015" and must be uniform throughout the entire circumference of the adjacent discs. In the manufacture of the transmitter the interior of the housing 48 is machined in one operation so that the bores 49 and 50 and the threads 51 are on a true center line. The periphery of clutch rotor 36 is held to a close tolerance with respect to the inner wall of the bore 50 so that the rotating hub portion 36' is concentric with the axis of clutch disc 24.

Reference was previously made to the trueness of the threads 51 formed in an inner portion of the housing 48. These screw threads are adapted to receive a ring-adjusting screw 52 machined so that its inner annular face portion 52' (see FIG. 2) is faced true relative to the threads 51. The face 52' of said ring-like adjusting screw 52 abuts a peripheral shouldered portion of the clutch disc 36 and, for adjustment purposes, a tool may be applied to the recess 53 in the adjusting screw 52 and the latter is thereby turned to provide the proper clearance at $g$ and $g'$ (FIG. 2) between the faces of the armature disc 28 and the respective face portions of the clutch discs 24 and 36. Access to the adjusting screw 52 is obtained through a side wall opening in the housing 48. A plurality of winged set screws are indicated by the numerals 54 and the same are threaded through angularly spaced apart, tapped openings 55 in a housing flange 56. The winged set screws 54 are manually turned so as to bring their inner end portions into firm impingement with portions of an annular collar 57 which is welded to a shouldered ring member 58 which has a rabbet joint connection with an outer face portion of the clutch rotor 36. It will thus be seen that the thickness of the gaps g and g' is adjusted by means of the ring-adjusting screw 52 and then the adjusted position of the parts is maintained by turning in the winged set screws 54 which abut the collar 57, which maintains the inner, shouldered face portion of the clutch rotor 36 against the face portion 52' of the adjusting ring screw 52, whereby shifting of the adjusted components is prevented. It might also be mentioned that the adjusted position of the ring-adjusting screw 52 is maintained by turning in a set screw 59.

From the foregoing it will be evident that the axes of the bores 49 and 50 and the adjusting screw bore 51 are concentric and at right angles to the faces of the adjusted elements. Actually the exterior of the clutch rotor 36 is secured, and this ensures proper positioning of the gear 39 on the hub portion 36' and permits the output shaft 26 to be journalled in the roller bearing 60 in which the hub portion 36' is axially disposed. By virtue of the exterior engagement of the clutch rotor 36, the hub 36' is utilized for the dual purpose of mounting the gear 39 and for journalling the shaft 26 on which the discs 28 and 36 are mounted. Consequently, there is a trued mounting of all of the specified components and parallelism thereof is maintained.

From the foregoing description it will be seen that the transmitter clutch disc alignment adjusting mechanism provides a simple and practical means for maintaining complementary clutch disc faces in parallelism and in axial alignment, with the ball bearing 60 serving as a common bearing for both the gear drive and the output shaft 26. The mechanism is relatively inexpensive, is easy to install and adjust and is well adapted for the purposes described.

What is claimed as the invention is:

1. In a transmitter, a housing, a pair of clutch discs co-axially mounted therewithin and having adjacent face portions spaced from one another, one of the clutch discs being axially shiftable relative to the other clutch disc to regulate the spacing between the adjacent face portions of said discs, an adjusting member co-axially mounted relative to said discs and axially adjustably carried within the housing and engaging the perimeter of said adjacent face portion of the axially shiftable clutch disc to adjustably space said disc from the adjacent face portion of the other clutch disc and to resist axial movement of the shiftable clutch disc toward the other clutch disc, and set screw means adjustably carried by the housing and exerting forces against peripherally spaced outer end portions of the shiftable clutch disc in opposition to the direction of force imposed by the first-mentioned adjusting member to releasably lock the discs in spaced relation.

2. In a transmitter, a housing having a bore, a pair of clutch discs co-axially mounted within the housing bore and having adjacent face portions spaced from one another, one of the clutch discs being axially shiftable relative to the other clutch disc to regulate the spacing between the adjacent face portions of said discs, a ring-like adjusting member in screw threaded engagement with inner wall portions of the housing and co-axially mounted relative to said discs and axially adjustable for engagement with the perimeter of said adjacent face portion of the axially shiftable clutch disc to adjustably space said disc from the adjacent face portion of the other clutch disc and to resist axial movement of the shiftable clutch disc toward the other clutch disc, means for releasably securing said adjusting member in an adjusted position, and set screw means adjustably carried by the housing and exerting forces againt peripherally spaced outer end portions of the shiftable clutch disc in opposition to the direction of force imposed by the first-mentioned adjusting member to releasably lock the discs in spaced relation.

References Cited in the file of this patent

UNITED STATES PATENTS

| | | |
|---|---|---|
| 1,490,859 | Sleeper | Apr. 15, 1924 |
| 1,761,366 | Reutter | June 3, 1930 |
| 2,070,813 | Stearns et al. | Feb. 16, 1937 |
| 2,082,969 | Myers | June 8, 1937 |
| 2,159,326 | Harwood et al. | May 23, 1939 |
| 2,345,244 | Eason | Mar. 28, 1944 |
| 2,913,081 | Rudisch | Nov. 17, 1959 |